(12) United States Patent
Albrecht

(10) Patent No.: US 7,758,981 B2
(45) Date of Patent: Jul. 20, 2010

(54) METHOD FOR MAKING A MASTER DISK FOR NANOIMPRINTING PATTERNED MAGNETIC RECORDING DISKS, MASTER DISK MADE BY THE METHOD, AND DISK IMPRINTED BY THE MASTER DISK

(75) Inventor: Thomas R. Albrecht, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 305 days.

(21) Appl. No.: 11/782,664

(22) Filed: Jul. 25, 2007

(65) Prior Publication Data

US 2009/0029191 A1   Jan. 29, 2009

(51) Int. Cl.
*G11B 5/66* (2006.01)
(52) U.S. Cl. .................. 428/826; 428/800; 428/817; 428/836
(58) Field of Classification Search .................. None
See application file for complete search history.

(56) References Cited

U.S. PATENT DOCUMENTS

| | | | |
|---|---|---|---|
| 5,930,065 A * | 7/1999 | Albrecht et al. ............ 360/72.2 |
| 6,042,998 A | 3/2000 | Brueck et al. |
| 6,303,205 B1 * | 10/2001 | Tanaka et al. ............ 428/848.1 |
| 6,667,237 B1 | 12/2003 | Metzler |
| 6,754,016 B2 * | 6/2004 | Messner et al. ............... 360/48 |
| 7,080,596 B2 | 7/2006 | Lee et al. |
| 2002/0168548 A1 * | 11/2002 | Sakurai et al. ........ 428/694 BR |
| 2005/0094549 A1 * | 5/2005 | Hieda et al. .................. 369/277 |
| 2006/0276043 A1 * | 12/2006 | Johnson et al. ............. 438/717 |
| 2007/0092650 A1 | 4/2007 | Albrecht et al. |
| 2008/0002295 A1 * | 1/2008 | Sakurai et al. .............. 360/131 |

FOREIGN PATENT DOCUMENTS

JP    2000113533    4/2000

OTHER PUBLICATIONS

Bandic et al., "Patterned magnetic media: impact of nanoscale patterning on hard disk drives", Solid State Technology S7+ Suppl. S, Sep. 2006.

(Continued)

*Primary Examiner*—Kevin M Bernatz
(74) *Attorney, Agent, or Firm*—Thomas R. Berthold

(57) ABSTRACT

A method for making a master disk to be used for nanoimprinting patterned-media magnetic recording disks uses sidewall lithography. In one implementation, the master disk substrate has a first pattern of concentric rings formed on it by sidewall lithography, followed by a second pattern of generally radially-directed pairs of parallel lines, also formed by sidewall lithography, with the pairs of parallel lines intersecting the rings. An etching process is then performed, using the upper pattern as an etch mask, to remove unprotected portions of the underlying concentric rings. This leaves a pattern of pillars on the substrate, which then serve as an etch mask for an etching process that etches unprotected portions of the master disk substrate. The resulting master disk then has pillars of substrate material arranged in a pattern of concentric rings and generally radially-directed pairs of parallel lines.

8 Claims, 19 Drawing Sheets

OTHER PUBLICATIONS

Terris et al., "Topical Review: Nanofabricated and self-assembled magnetic structures as data storage media", J. Phys. D: Appl. Phys. 38 (2005) R199-R222.

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

Kwon et al., "Fabrication of Metallic Nanodots in Large-Area Arrays by Mold-to-Mold Cross Imprinting," Nano Letters, vol. 5, No. 12, pp. 2557-2562 (2005).

* cited by examiner

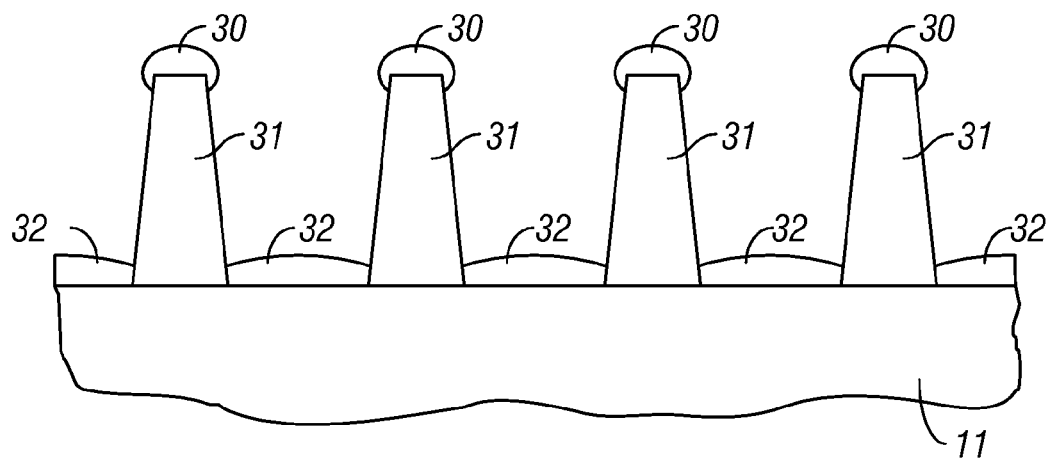
FIG. 3
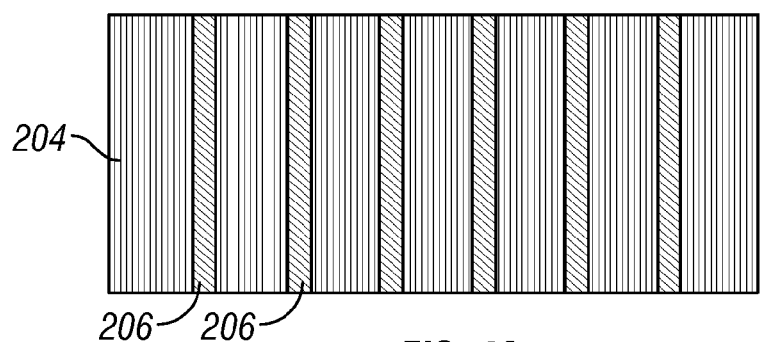
FIG. 4A
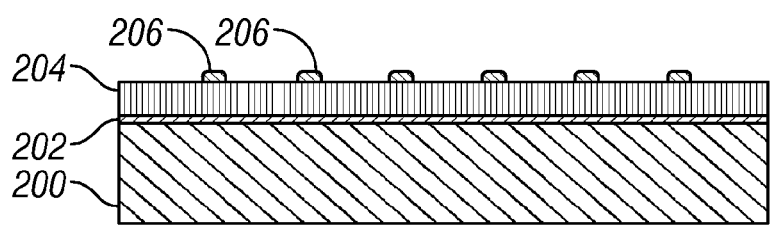
FIG. 4B
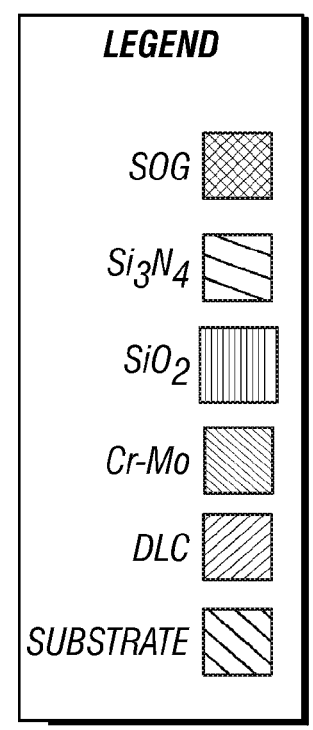

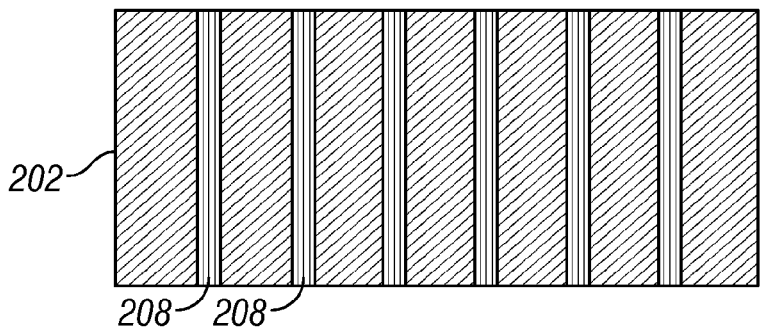
FIG. 5A
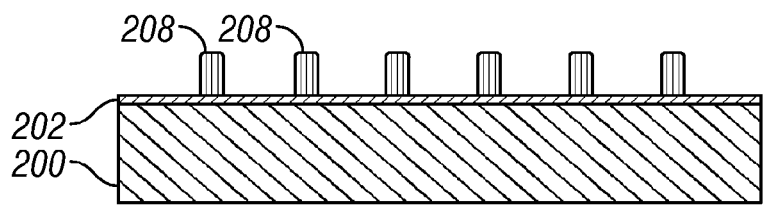
FIG. 5B
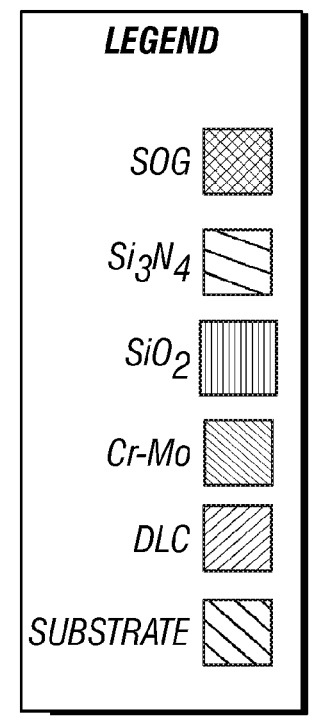
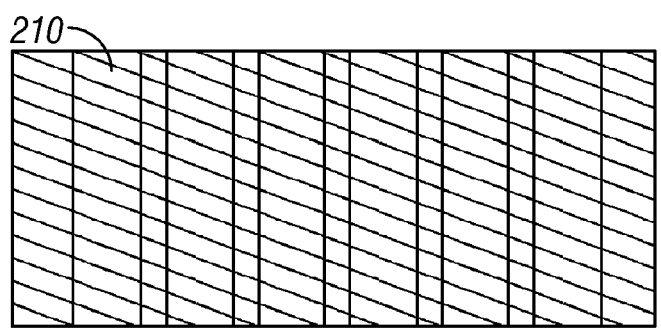
FIG. 6A
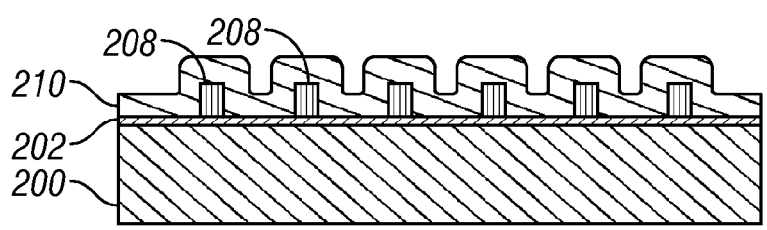
FIG. 6B

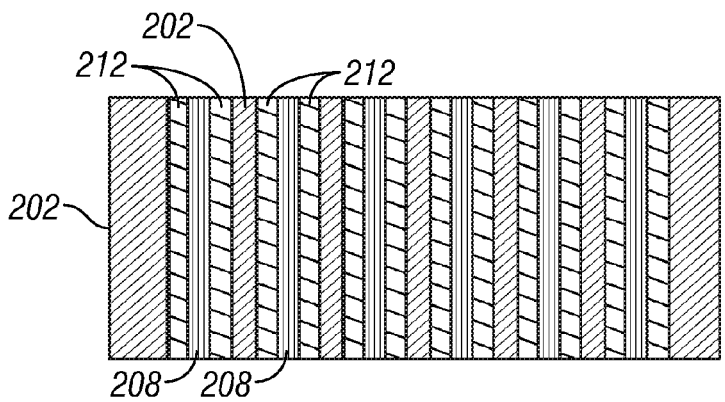
FIG. 7A
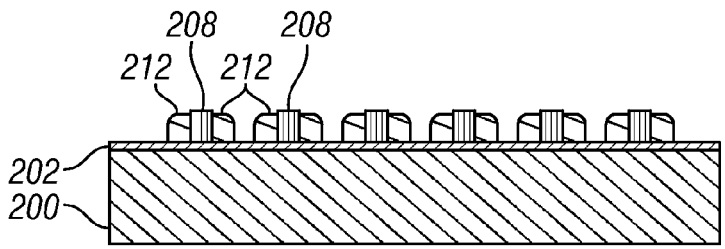
FIG. 7B
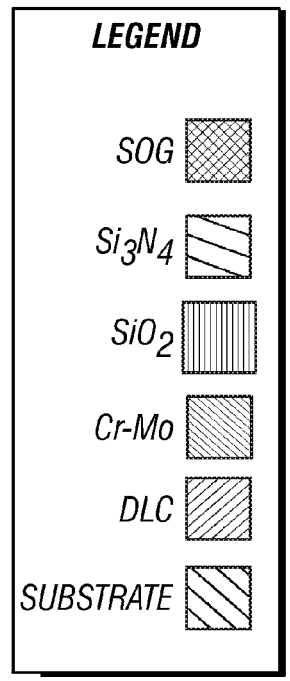
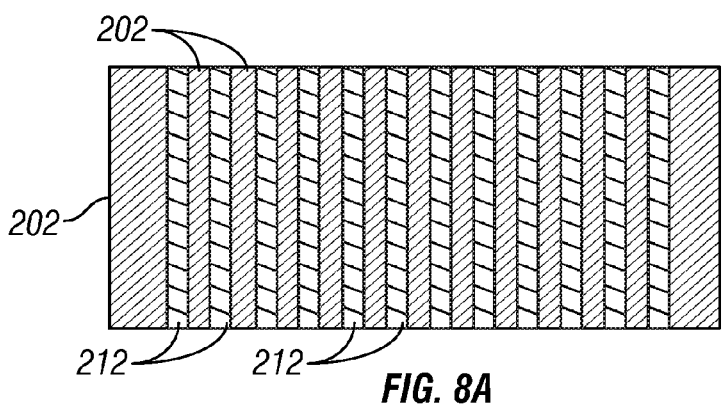
FIG. 8A
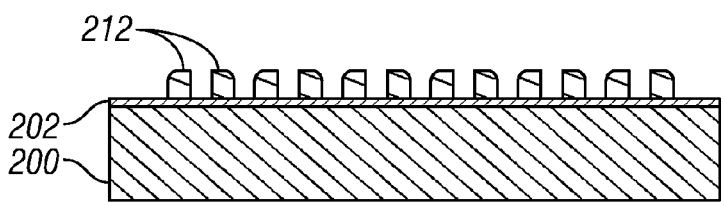
FIG. 8B

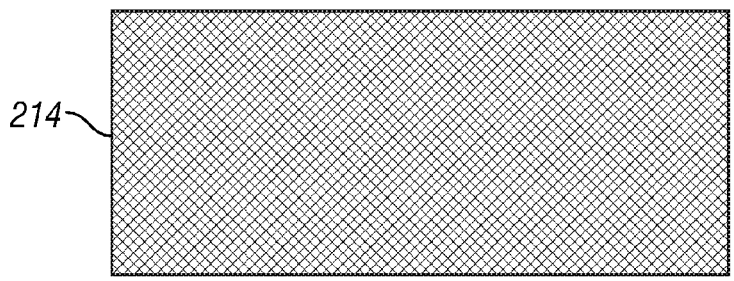
FIG. 9A
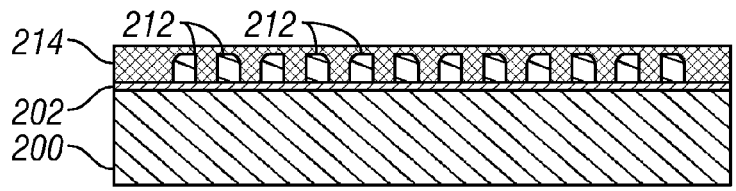
FIG. 9B
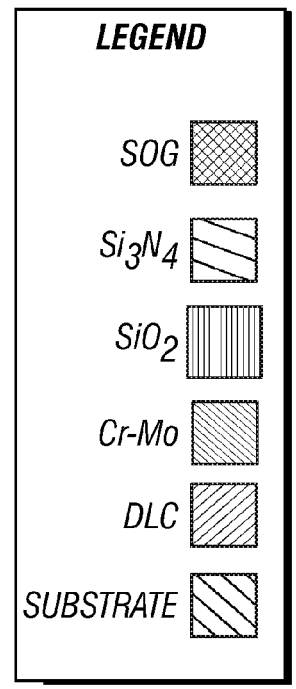
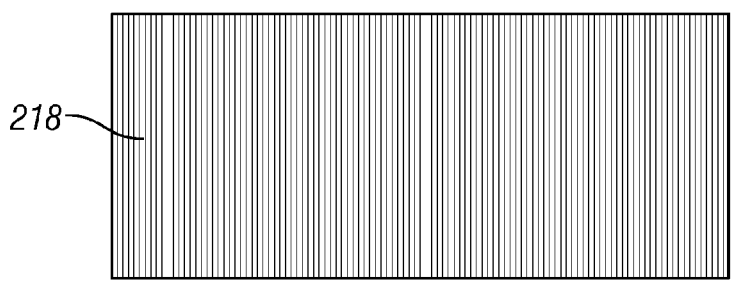
FIG. 10A
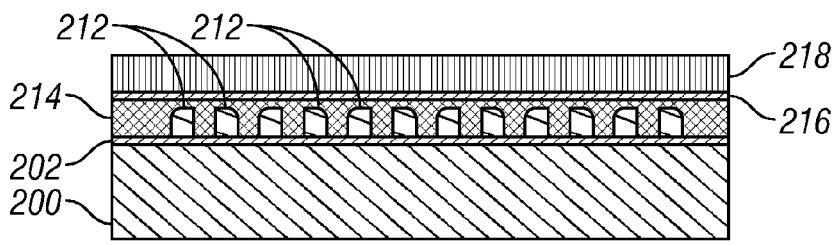
FIG. 10B

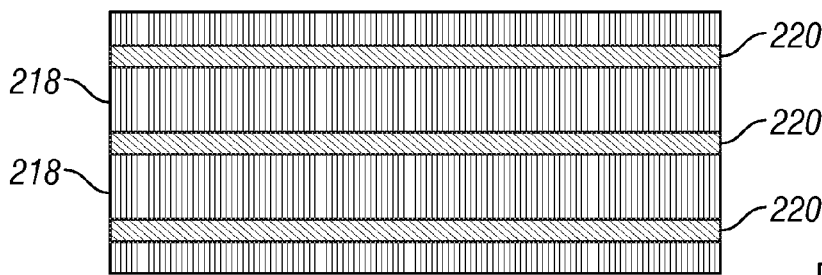
FIG. 11A
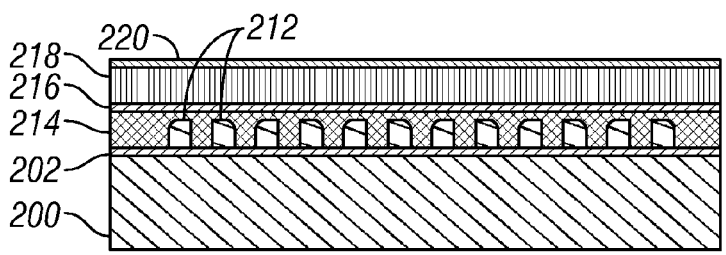
FIG. 11B
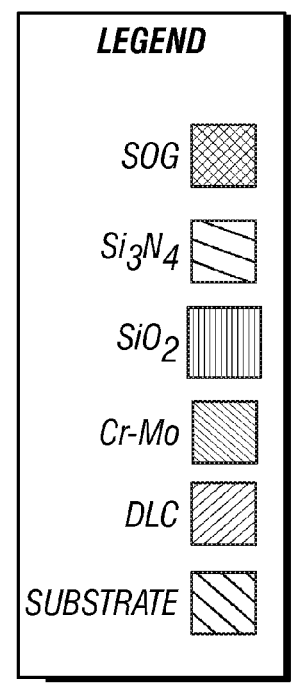
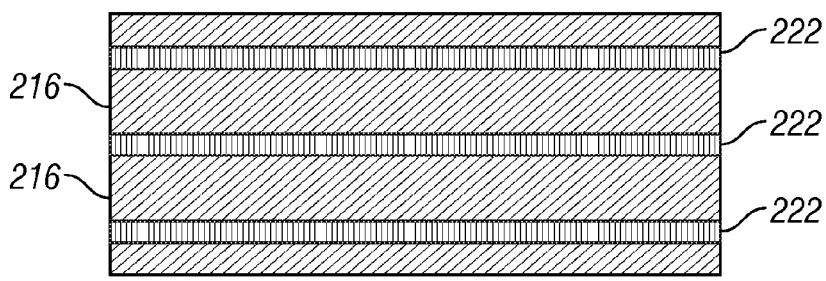
FIG. 12A
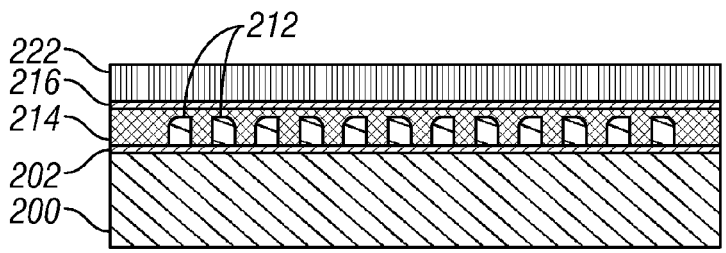
FIG. 12B

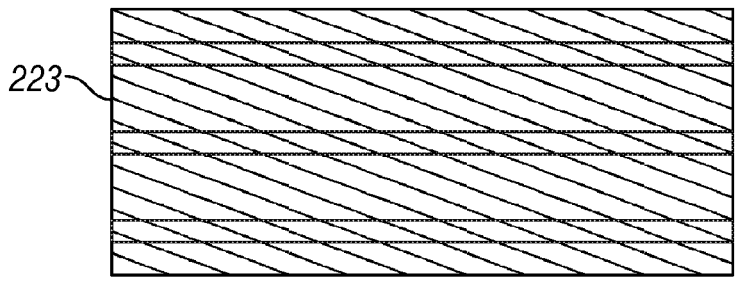
FIG. 13A
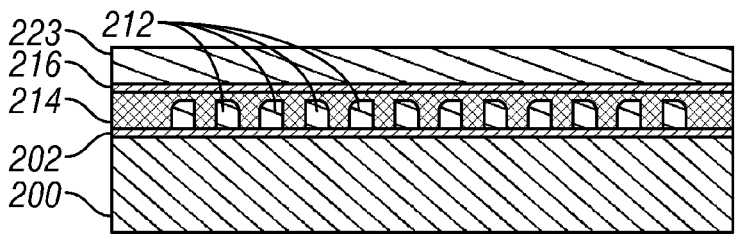
FIG. 13B
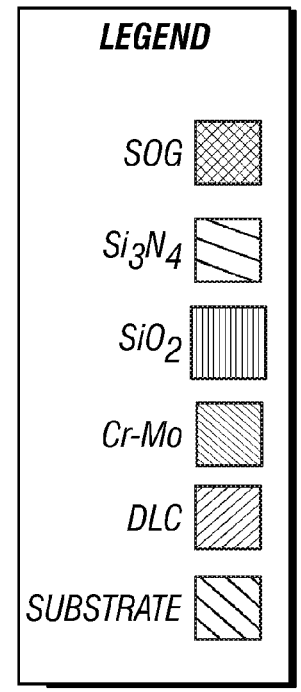
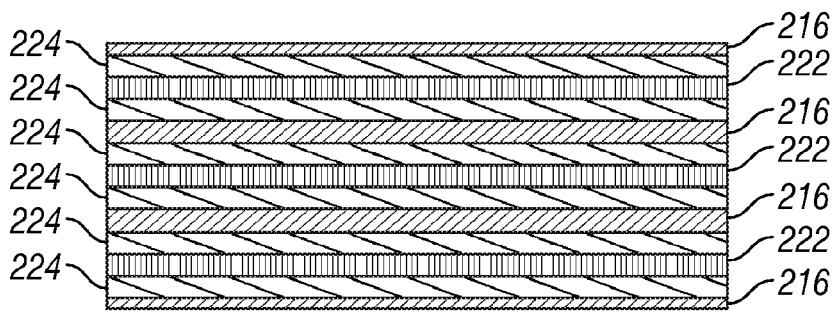
FIG. 14A
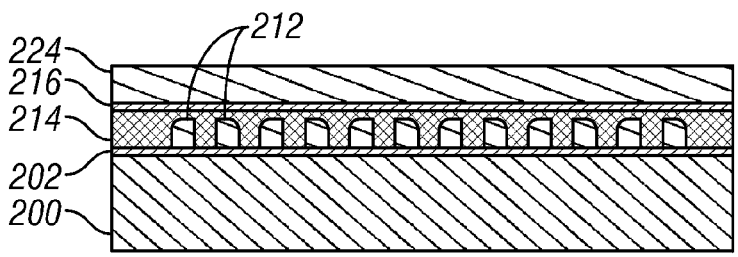
FIG. 14B

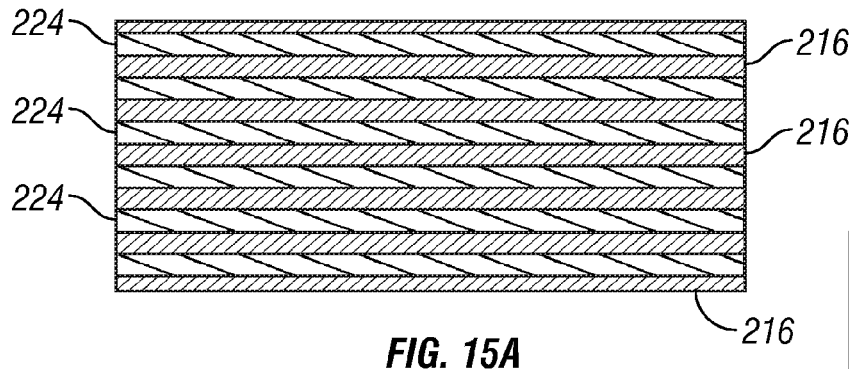
FIG. 15A
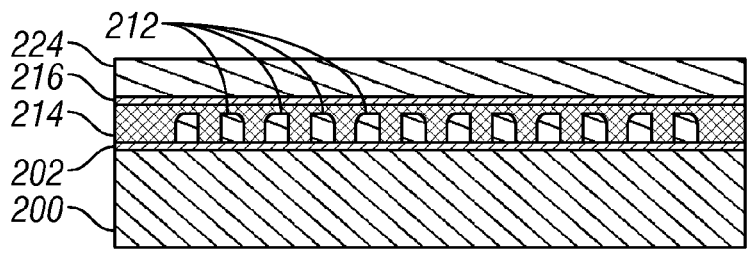
FIG. 15B
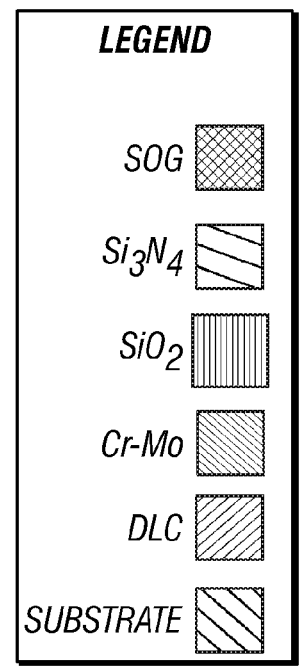
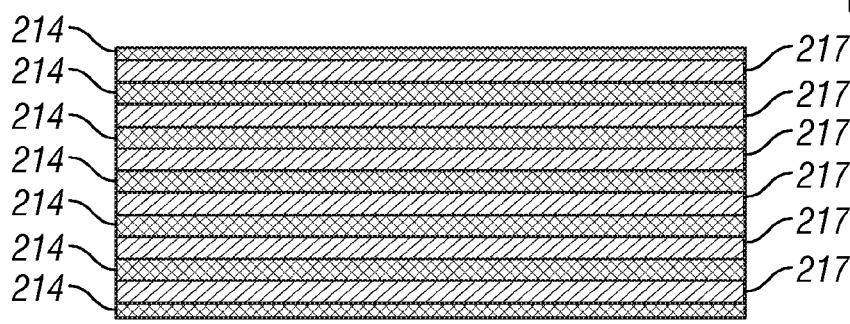
FIG. 16A
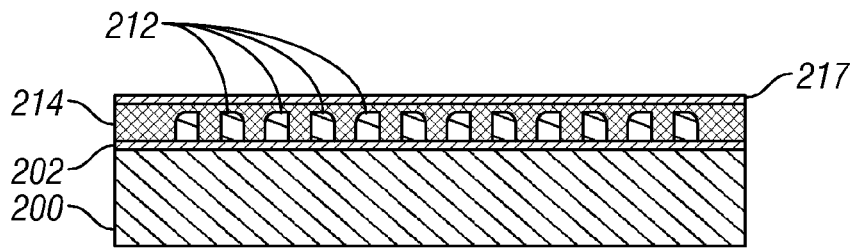
FIG. 16B

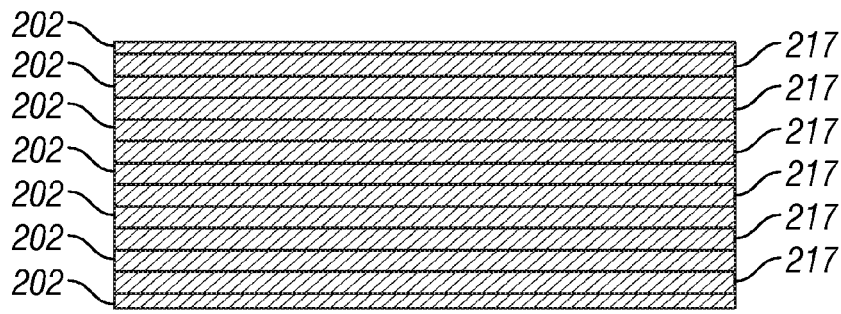
FIG. 17A
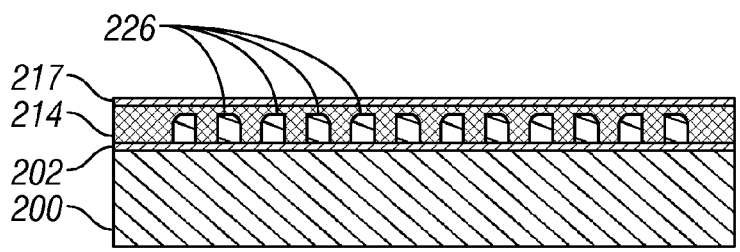
FIG. 17B
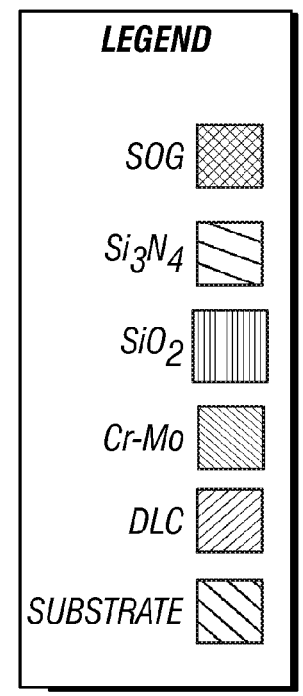
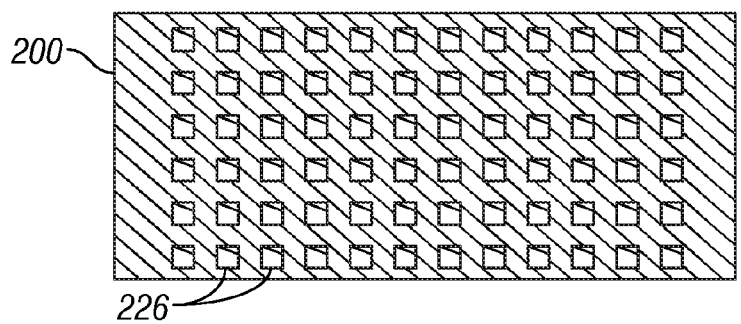
FIG. 18A
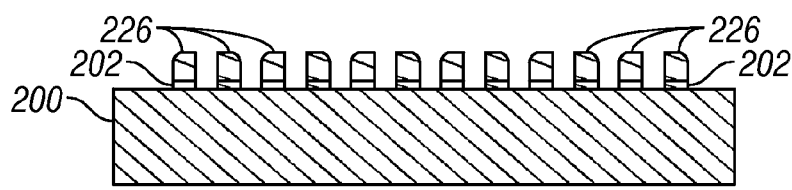
FIG. 18B

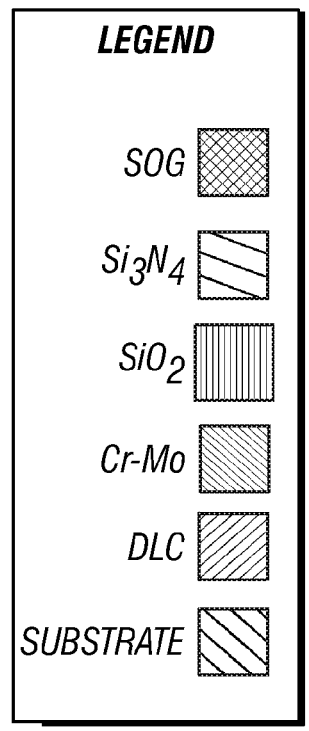
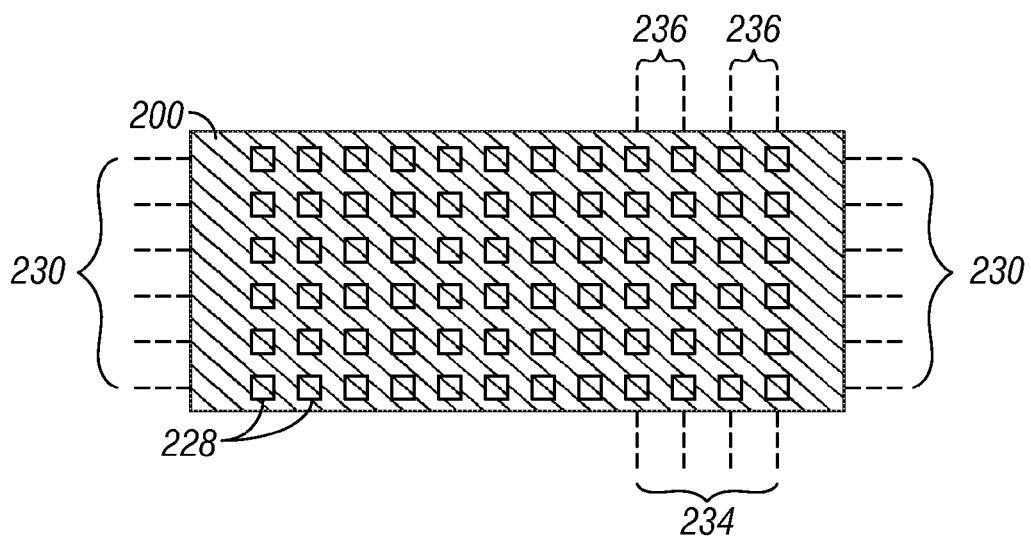
FIG. 19A
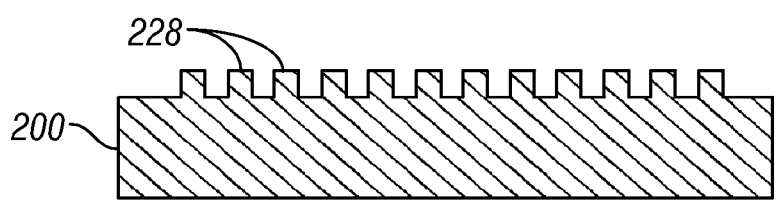
FIG. 19B

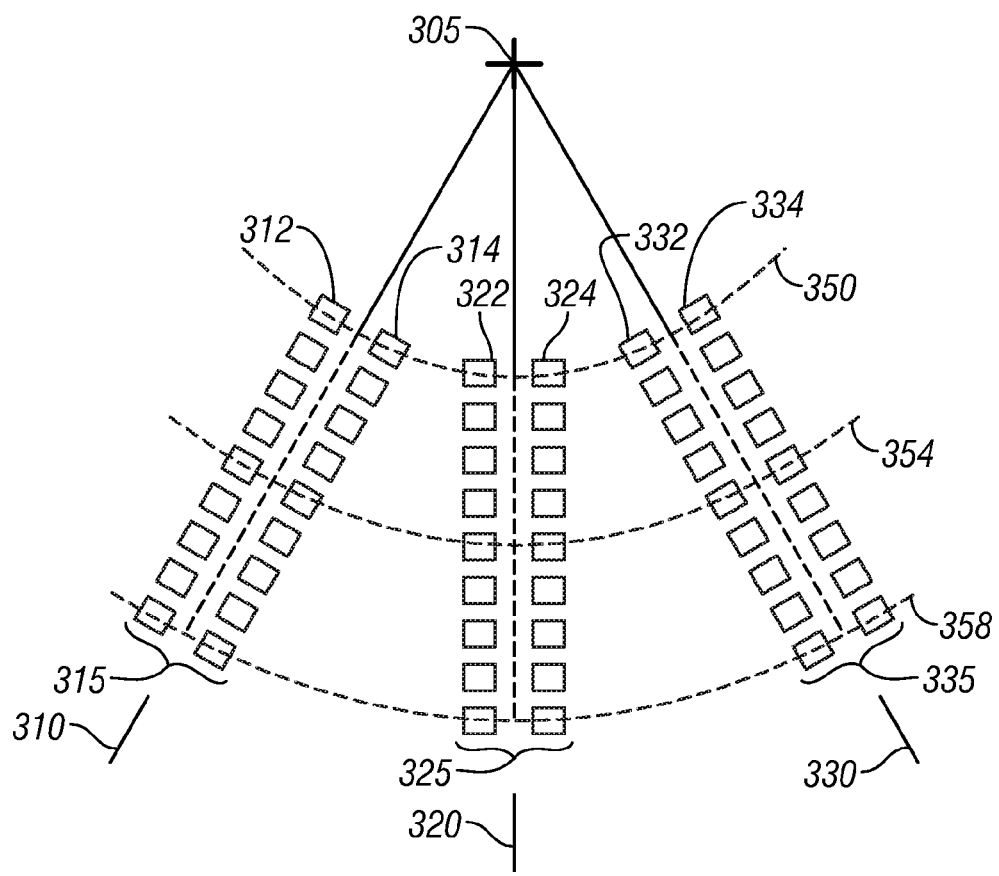
FIG. 21
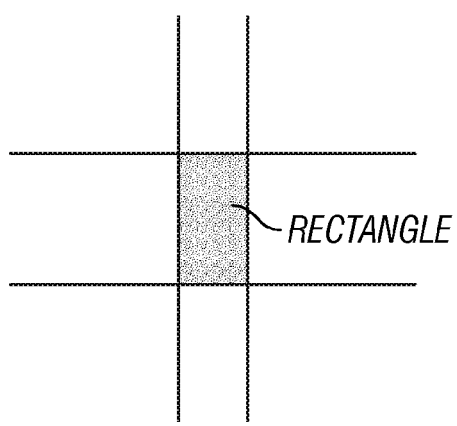
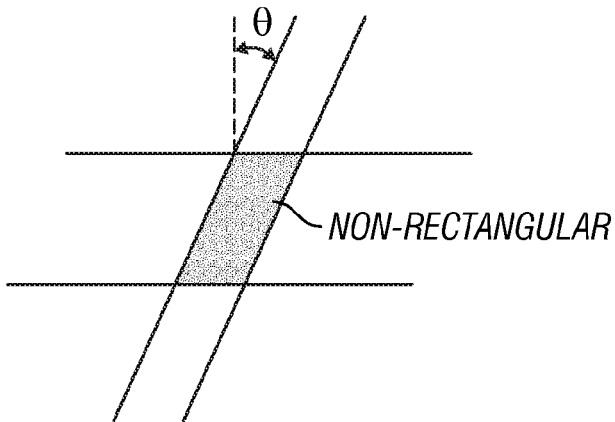
FIG. 22A          FIG. 22B

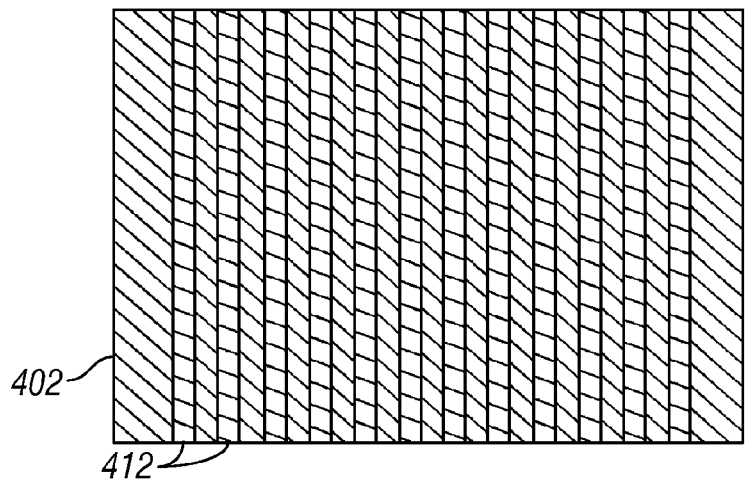
FIG. 23A
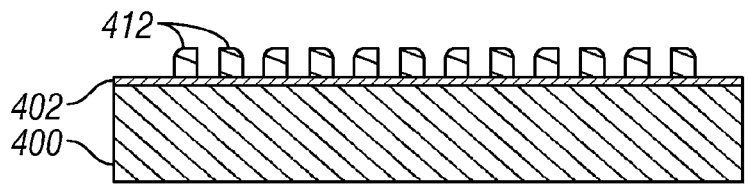
FIG. 23B
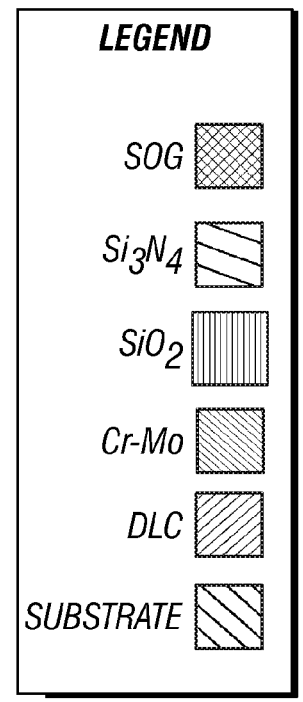
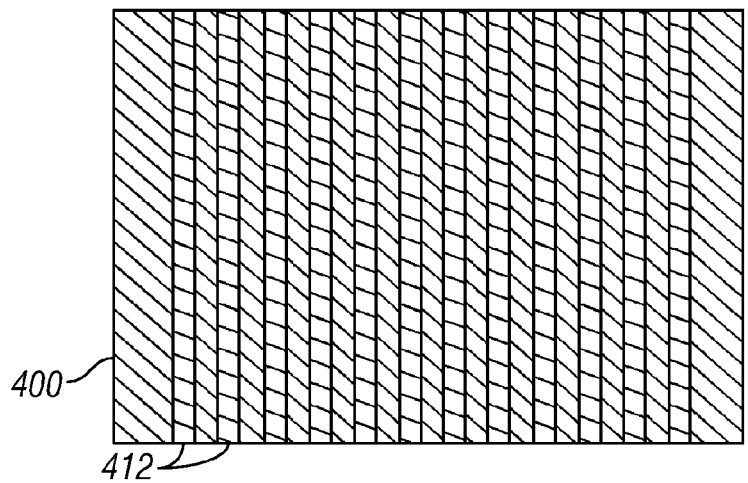
FIG. 24A
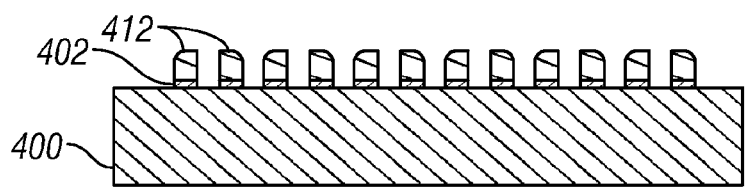
FIG. 24B

METHOD FOR MAKING A MASTER DISK FOR NANOIMPRINTING PATTERNED MAGNETIC RECORDING DISKS, MASTER DISK MADE BY THE METHOD, AND DISK IMPRINTED BY THE MASTER DISK

BACKGROUND OF THE INVENTION

1. Field of the Invention

This invention relates generally to patterned-media magnetic recording disks, wherein each data bit is stored in a magnetically isolated data island on the disk, and more particularly to a method for making a master disk to be used for nanoimprinting the patterned-media disks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the islands and the trenches, with the magnetic material in the trenches being rendered nonmagnetic, typically by "poisoning" with a material like silicon (Si). Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a master disk or "stamper" having a topographic surface pattern. In this method the magnetic recording disk substrate with a polymer film on its surface is pressed against the master disk. The polymer film receives the image of the master disk pattern and then becomes a mask for subsequent etching of the disk substrate. The magnetic layer and other layers needed for the magnetic recording disk are then deposited onto the etched disk substrate to form the patterned-media disk. Nanoimprinting of patterned media is described by Bandic et al., "Patterned magnetic media: impact of nanoscale patterning on hard disk drives", *Solid State Technology S7+ Suppl. S, SEP* 2006; and by Terris et al., "TOPICAL REVIEW: Nanofabricated and self-assembled magnetic structures as data storage media", *J. Phys. D: Appl. Phys.* 38 (2005) R199-R222.

The making of the master template or disk is a difficult and challenging process. The use of electron beam (e-beam) lithography using a Gaussian beam rotary-stage e-beam writer is viewed as a possible method to make a master disk capable of nanoimprinting disks with magnetic islands with width and length dimensions around 20 nm and a pitch (island-to-island spacing) of about 35 nm. However, these dimensions generally limit the areal bit density of the disks to about 500 Gbit/in$^2$.

What is needed is a master disk and a method for making it that can result in patterned-media magnetic recording disks with feature sizes smaller than what could be achieved if the master disk were to be fabricated by e-beam lithography.

SUMMARY OF THE INVENTION

The invention is a method for making a master disk to be used for nanoimprinting patterned-media magnetic recording disks. The method uses sidewall lithography, a known process for creating two parallel line features using a single line feature as a starting point. This is accomplished by depositing material on both sides of a ridge feature, and then removing the ridge, leaving two parallel ridges or strips that were originally formed along the two sides of the single original ridge.

In a first implementation, the substrate that is to become the master disk has a first pattern of concentric rings formed on it by sidewall lithography. Then a second pattern of generally radially-directed pairs of parallel lines, also formed by sidewall lithography, is formed over the concentric rings so that the rings and lines intersect. An etching process is then performed, using the upper pattern as an etch mask, to remove unprotected portions of the underlying concentric rings. This leaves a pattern of pillars on the substrate, which then serve as an etch mask for an etching process that etches unprotected portions of the master disk substrate. The resulting master disk then has pillars of substrate material arranged in a pattern of concentric rings and generally radially-directed pairs of parallel lines. The pattern of generally radially-directed pairs of parallel lines may be formed first, with the pattern of concentric rings formed on top of the pattern of parallel lines.

In another implementation, sidewall lithography is used to make two different molds, which are then used to make the master disk. Each mold has grooves corresponding to one of the two patterns of concentric rings or generally radially-directed pairs of parallel lines. The master disk substrate is covered with a protective layer and a resist layer. The first mold is impressed on the resist layer, and the resulting resist pattern is used as an etch mask to etch away the protective layer not covered by the resist, leaving strips of resist and underling protective layer corresponding to the pattern of the first mold. The second mold is then impressed on the strips of resist with the grooves of the second mold intersecting the resist strips formed in the first pattern. The resulting resist pattern is used as an etch mask to etch away remaining portions of the protective layer not covered by the resist, leaving pillars of resist and underlying protective layer. The pillars then serve as an etch mask for an etching process that etches unprotected portions of the master disk substrate. The resulting master disk then has pillars of substrate material arranged in a pattern of concentric rings and generally radially-directed pairs of parallel lines.

The concentric rings are preferably grouped as annular bands, with each band having its own set of intersecting generally radially-directed pairs of lines. The two intersecting patterns may be designed so that the resulting pillars on the master disk substrate are arranged with the pillars in a ring generally at the middle of a band being generally equally angularly spaced.

The invention also relates to a master disk made by the above-described method, as well as to a magnetic recording disk formed by a nanoimprinting process using the master disk made by the above-described method.

For a fuller understanding of the nature and advantages of the present invention, reference should be made to the following detailed description taken together with the accompanying figures.

BRIEF DESCRIPTION OF THE DRAWING

FIG. 3 is a side sectional view of one type of patterned-media disk showing the data islands as elevated, spaced-apart pillars that extend above the disk substrate surface with trenches between the pillars.

FIGS. 4A and 4B illustrate top and side sectional views, respectively, of a step in a first implementation of this invention wherein sidewall lithography is used to make the master disk.

FIGS. 5A and 5B illustrate top and side sectional views, respectively, of a step in a first implementation of this invention wherein sidewall lithography is used to make the master disk.

FIGS. 6A and 6B illustrate top and side sectional views, respectively, of a step in a first implementation of this invention wherein sidewall lithography is used to make the master disk.

FIGS. 7A and 7B illustrate top and side sectional views, respectively, of a step in a first implementation of this invention wherein sidewall lithography is used to make the master disk.

FIGS. 8A and 8B illustrate top and side sectional views, respectively, of a step in a first implementation of this invention wherein sidewall lithography is used to make the master disk.

FIGS. 9A and 9B illustrate top and side sectional views, respectively, of a step in a first implementation of this invention wherein sidewall lithography is used to make the master disk.

FIGS. 10A and 10B illustrate top and side sectional views, respectively, of a step in a first implementation of this invention wherein sidewall lithography is used to make the master disk.

FIGS. 11A and 11B illustrate top and side sectional views, respectively, of a step in a first implementation of this invention wherein sidewall lithography is used to make the master disk.

FIGS. 12A and 12B illustrate top and side sectional views, respectively, of a step in a first implementation of this invention wherein sidewall lithography is used to make the master disk.

FIGS. 13A and 13B illustrate top and side sectional views, respectively, of a step in a first implementation of this invention wherein sidewall lithography is used to make the master disk.

FIGS. 14A and 14B illustrate top and side sectional views, respectively, of a step in a first implementation of this invention wherein sidewall lithography is used to make the master disk.

FIGS. 15A and 15B illustrate top and side sectional views, respectively, of a step in a first implementation of this invention wherein sidewall lithography is used to make the master disk.

FIGS. 16A and 16B illustrate top and side sectional views, respectively, of a step in a first implementation of this invention wherein sidewall lithography is used to make the master disk.

FIGS. 17A and 17B illustrate top and side sectional views, respectively, of a step in a first implementation of this invention wherein sidewall lithography is used to make the master disk; and FIGS. 18A and 18B illustrate top and side sectional views, respectively, of a step in a first implementation of this invention wherein sidewall lithography is used to make the master disk.

FIGS. 19A and 19B illustrate top and side sectional views, respectively, of a step in a first implementation of this invention wherein sidewall lithography is used to make the master disk.

FIG. 21 is an expanded view of a portion of the master disk shown in FIG. 20 and shows a plurality of pillars arranged in nine concentric rings.

FIG. 22A illustrates a rectangular-shaped pillar that would be produced if radial ridges are used in the sidewall lithography process, resulting in disks having the magnetic island pattern shown in FIG. 2A.

FIG. 22B illustrates a non-rectangular parallelogram-shaped pillar that would be produced if generally radially-directed ridges are used in the sidewall lithography process, resulting in disks having the magnetic island pattern shown generally in FIG. 2B.

FIGS. 23A and 23B illustrate top and side sectional views, respectively, of a step in a second implementation of this invention wherein sidewall lithography is used to make two different molds, which are then used to make the master disk.

FIGS. 24A and 24B illustrate top and side sectional views, respectively, of a step in a second implementation of this invention wherein sidewall lithography is used to make two different molds, which are then used to make the master disk.

DETAILED DESCRIPTION OF THE INVENTION

Figure 1:
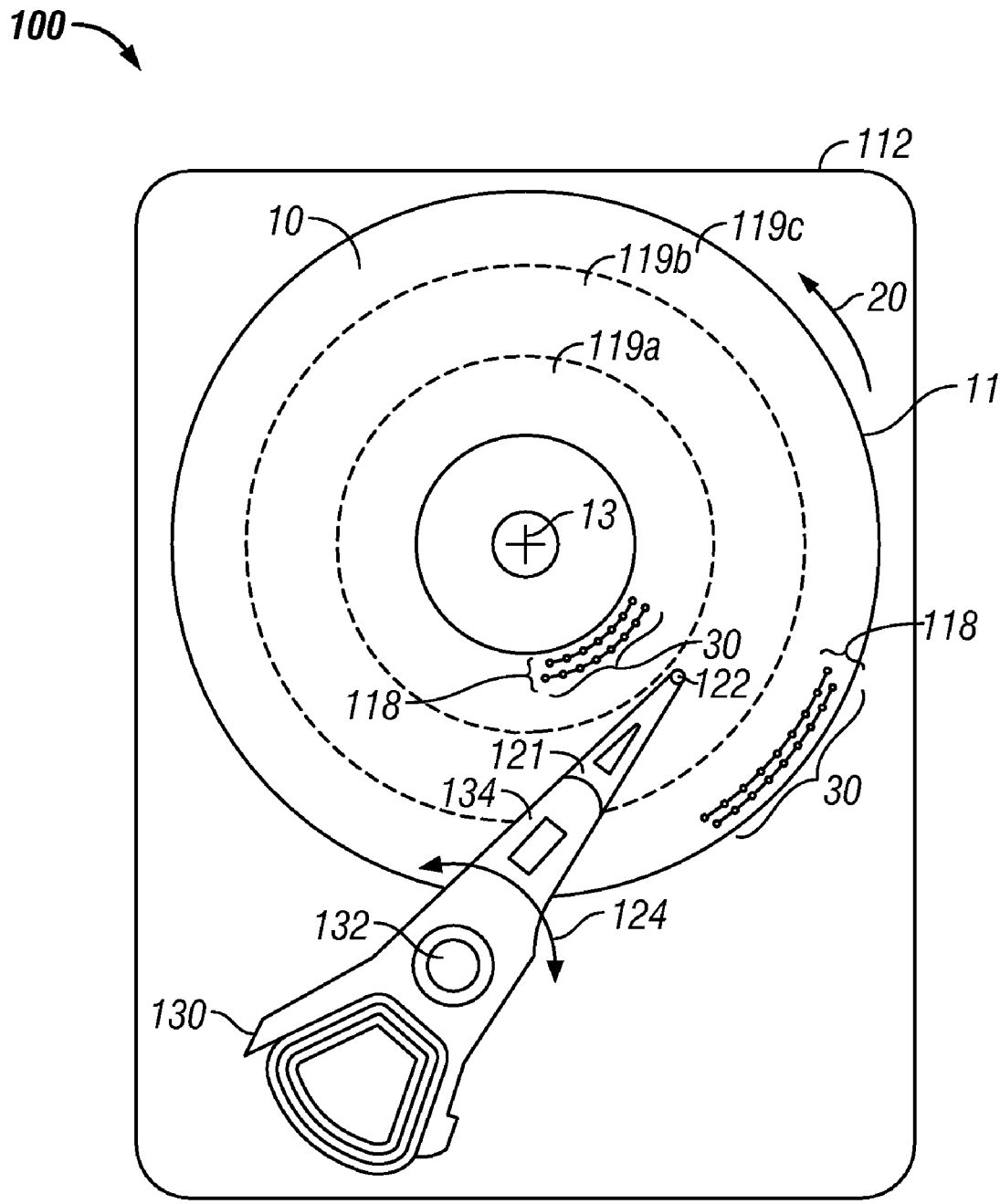
FIG. 1 is a top view of a disk drive with a patterned-media type of magnetic recording disk as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. The grouping of the data tracks into annular bands permits banded recording, wherein the angular spacing of the data islands, and thus the data rate, is different in each band. In FIG. 1, only a few islands 30 and representative tracks 118 are shown in the inner band 119a and the outer band 119c. As the disk 10 rotates about its center 13 in the direction of arrow 20, the movement of actuator 130 allows the read/write head on the trailing end of head carrier 122 to access different data tracks 118 on disk 10.

Figure 2A:
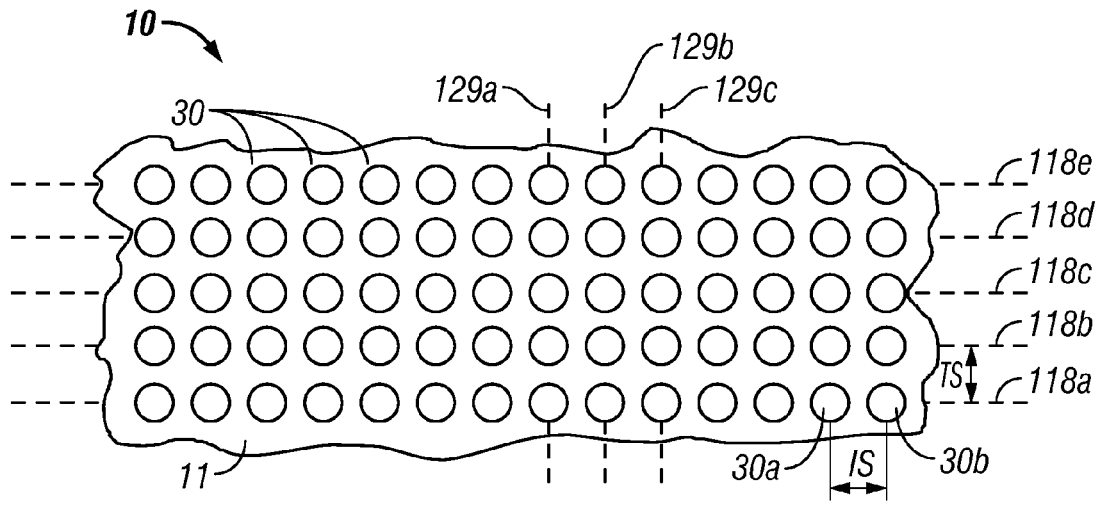
FIG. 2A is a top view of an enlarged portion of a patterned-media type of magnetic recording disk showing the detailed arrangement of the data islands in one of the bands on the surface of the disk substrate.

FIG. 2A is a top view of an enlarged portion of disk 10 showing the detailed arrangement of the data islands 30 in one of the bands on the surface of disk substrate 11 according to the prior art. The islands 30 contain magnetizable recording material and are arranged in tracks spaced-apart in the radial or cross-track direction, as shown by tracks 118a-118e. The tracks are typically equally spaced apart by a fixed track spacing TS. Within each track 118a-118e, the islands 30 are equally spaced apart by a fixed along-the-track island spacing IS, as shown by typical islands 30a, 30b, where IS is the spacing between the centers of two adjacent islands in a track. The islands 30 are also arranged into radial lines, as shown by radial lines 129a, 129b and 129c that extend from disk center 13 (FIG. 1). Because FIG. 2A shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

Figure 2B:
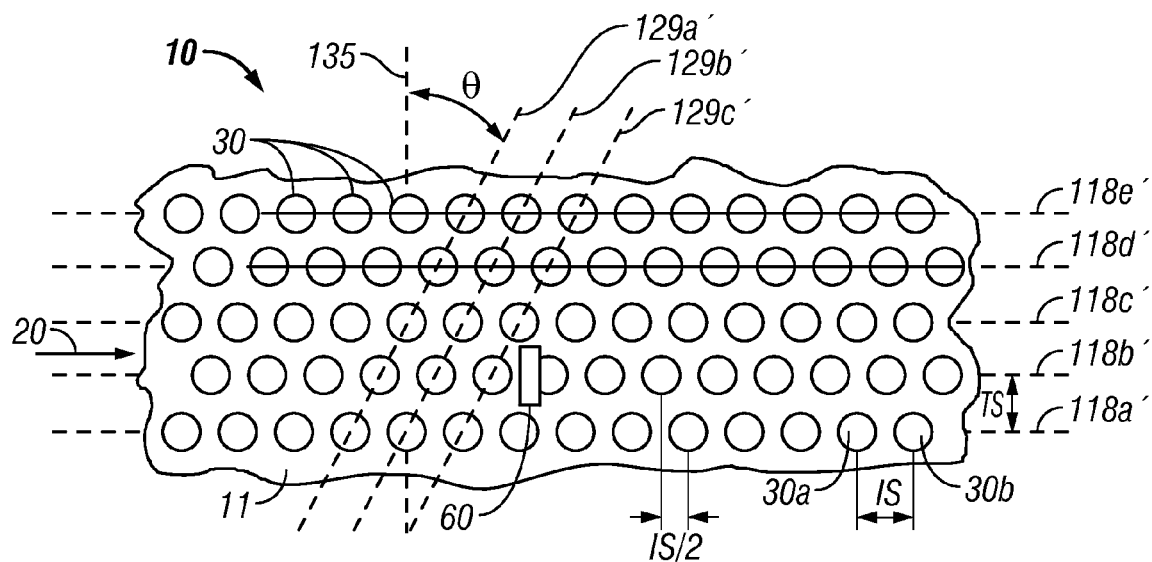
FIG. 2B is a top view of an enlarged portion of a patterned-media type of magnetic recording disk showing a pattern for the data islands different from the pattern of FIG. 2A.

The radial lines (like lines 129a, 129b, 129c) may be perfectly straight radial lines but are preferably arcs or arcuate-shaped radial lines that replicate the arcuate path of the read/write head on the rotary actuator. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified FIG. 2B shows an enlarged portion of disk 10 with a different pattern for data islands 30. Within each track 118a'-118e', the islands 30 are equally spaced apart by a fixed along-the-track island spacing IS, as shown by typical islands 30a, 30b, where IS is the spacing between the centers of two adjacent islands in a track. However, the islands in each track are shifted in the along-the-track direction by one-half the island spacing (IS/2) from the islands in adjacent tracks. For example, the islands in track 118b' are shifted a distance IS/2 from the islands in adjacent tracks 118a' and 118c'. As a result, the islands 30 are also arranged in radial lines that are not purely radial, but generally radially-directed, as shown by lines 129a', 129b', 129c. The lines 129a', 129b', 129c' form an acute angle θ with a purely radial line 135. The lines 129a', 129b', 129c' are not parallel lines, but lines with a constant angular spacing, i.e., the angular spacing as measured from the center 13 of the disk for adjacent bits in lines 129a' and 129b' in a radially inner track (like track 118e') is the same as the angular spacing for adjacent bits in lines 129a' and 129b' in a radially outer track (like track 118a').

FIG. 2B also shows a head element 60, which may represent either a read head or a write head, aligned over the center of track 118b'. If the element 60 is a read head, then as the disk rotates in the direction of arrow 20, the magnetized data islands in track 118b' will pass the head element 60 and generate a specific readback signal, depending on the directions of magnetization of the individual islands. However, because the islands in adjacent tracks 118a' and 118c' are shifted in the along-the-track direction by a distance IS/2 from the islands in track 118b', any readback signal interference from these adjacent tracks will be out of phase with the readback signal from track 118b', the track being read. Thus the pattern of data islands shown in FIG. 2B results in a reduced error rate for the data being read.

It may also be desirable to have the islands in the pattern of FIG. 2B be arranged in arcuate-shaped lines for the same reason as explained above for the pattern of FIG. 2A. However, in this case the islands in alternate tracks form arcuate-shaped lines in the radial direction. Thus line 135, which intersects islands in alternate rows 118a', 118c' and 118e', would have the desired arcuate shape that replicates the path of the read/write head as the rotary actuator moves the head across the tracks. The lines 129a', 129b' and 129c' would have thus not be perfectly straight but would have a shape that results in the islands in alternate tracks forming the desired arcuate-shaped line.

Patterned-media disks like that shown in FIGS. 2A and 2B may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-ofthe-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume nanoimprinting process using a master template or disk. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

However, the making of the master template or disk is a difficult and challenging process. The use of electron beam (e-beam) lithography using a Gaussian beam rotary-stage e-beam writer is viewed as a possible method to make a master disk capable of nanoimprinting disks with magnetic islands with width and length dimensions around 30 nm and a pitch (island-to-island spacing) of about 60 nm. Various "density multiplier" schemes have been proposed that can generate multiple spots from each e-beam feature, effectively multiplying the bit density by a small integer. An example of a density multiplier scheme is the "shadow mask" approach described in pending application Ser. No. 11/252,457 filed Oct. 18, 2005, published as US 20070092650 A1 and assigned to the same assignee as this application.

The present invention relates to a "sidewall lithography" method for making the master disk that is used in the nanoimprinting process to make patterned-media disks, like those illustrated in FIGS. 2A-2B. Sidewall lithography is a known process for creating two parallel line features using a single line feature as a starting point. This is accomplished by depositing material on both sides of a ridge feature, and then removing the ridge, leaving two parallel ridges or strips that were originally formed along the two sides of the single original ridge. The use of sidewall lithography to make arrays of metallic dots arranged in a rectangular pattern of two sets of intersecting parallel lines has been described by Kwon et al., "Fabrication of Metallic Nanodots in Large-Area Arrays by Mold-to-Mold Cross Imprinting," *Nano Letters*, Vol. 5, No. 12, pp. 2557-2562 (2005). However, this simple arrangement of dots is not useful for patterned-media disks. For patterned-media disks the dots must be arranged in circular tracks, not straight lines. Also, sidewall lithography generates parallel lines, whereas the dots in patterned-media disks must be arranged in non-parallel radially-directed lines, like those shown in FIGS. 2A and 2B.

One implementation of the method of this invention for making the master disk will be explained with FIGS. 4A-4B through FIGS. 19A-19B. In each of the figures, figure A is a top view and figure B is a side sectional view. The method uses sidewall lithography to directly form the master disk with pillars that are arranged into a pattern of concentric rings and generally radially-directed lines intersecting the rings. A variety of materials and processes may be used, with the common feature being the use of sidewall lithography to produce the master disk with a pattern of pillars useful for making patterned-media disks.

In FIGS. 4A-4B, a Si substrate is 200 coated first with a thin layer 202 (~10 nm) of diamond-like carbon (DLC) and then with a somewhat thicker layer 204 (~30 nm) of $SiO_2$. A resist layer (not shown) is deposited on the $SiO_2$ and high resolution electron beam (e-beam) lithography is then performed, leaving a resist pattern with square ridges separated by narrow grooves. A Cr—Mo alloy layer is then deposited, followed by a conventional lift-off process, leaving thin (~10 nm) narrow parallel stripes 206 of Cr—Mo in a regular one-dimensional array. For this example, the pitch of the stripes 206 may be about 60 nm and the width of the stripes 206 may be about 15 nm. In this example the concentric ring pattern is to be formed first, so the e-beam writer writes concentric rings during the lithography step, and the parallel stripes 206 of Cr—Mo are thus concentric rings.

In FIGS. 5A-5B, anisotropic reactive ion etching (RIE) is performed. For example, a fluorine-based chemistry is used to etch through the $SiO_2$ layer, using the Cr—Mo stripes 206 as an etch mask. This leaves concentric ridges 208 of $SiO_2$ on top of the DLC layer 202. The remaining Cr—Mo material is then stripped with a wet etch.

In FIGS. 6A-6B, a conformal deposition process such as chemical vapor deposition is used to coat the $SiO_2$ ridges 208, their sidewalls, and the spaces between them with a 15 nm thick layer 210 of $Si_3N_4$.

In FIGS. 7A-7B, an anisotropic fluorine-based RIE process is used to etch through and remove the $Si_3N_4$ in the regions over the tops of the $SiO_2$ ridges 208 and the regions between the ridges 208, leaving parallel strips 212 of $Si_3N_4$ abutting the two sidewalls of each ridge 208. If the process is perfectly anisotropic (i.e., it etches straight downward only, with no sidewall attack), the remaining $Si_3N_4$ strips 212 will be about 15 nm thick. The $Si_3N_4$ strips 212 are concentric rings.

In FIGS. 8A-8B, the $SiO_2$ ridges 208 are removed by a wet etch (e.g., concentrated potassium hydroxide solution), leaving an array of $Si_3N_4$ strips 212 on DLC layer 202 with half the period (about 30 nm) of the original $SiO_2$ ridges 208. The width of the original ridges 208, the thickness of the $Si_3N_4$ deposition, and the anisotropy of the RIE step may all be optimized to provide the desired array dimensions. The resulting structure in FIGS. 8A-8B is a plurality of $Si_3N_4$ strips 212 that are concentric rings.

In FIGS. 9A-9B, the entire structure, including the ridge regions between the $Si_3N_4$ strips 212 where the $SiO_2$ ridges 208 were previously located, is buried with a self-planarizing spin-on-glass (SOG) material 214. Chemical-mechanical polishing (CMP) may be used to further planarize the SOG material 214 if any undesirable ridge topography is present on the surface of the SOG material 214. Alternatively, CMP may be used to planarize the surface of a material deposited in a manner that is not self-planarizing, such as by chemical vapor deposition, sputtering, or another vacuum process.

In FIGS. 10A-10B, which is analogous to FIGS. 4A-4B, a layer 216 of DLC and a layer 218 of $SiO_2$ are deposited on top of the planarized surface of the SOG material 214.

In FIGS. 11A-11B, a similar e-beam and lift-off process is used as in FIGS. 4A-4B, except that the stripes 220 of Cr—Mo material are oriented at an angle (shown as 90 degrees in FIGS. 11A-11B) relative to the concentric rings of $Si_3N_4$ strips 212 that were formed in FIGS. 4A-4B. The stripes 220 are like the radial lines 129a-129c in FIG. 2A or the angled, generally radially-directed lines 129a'-129c' in FIG. 2B.

In FIGS. 12A-12B, which are analogous to FIGS. 5A-5B, an RIE process is used to create $SiO_2$ ridges 222 on DLC layer 216 which cross the buried $Si_3N_4$ strips 212 from FIGS. 8A-8B. The $SiO_2$ ridges 222 are generally radially-directed ridges, like the radial lines 129a-129c in FIG. 2A or the angled, generally radially-directed lines 129a'-129c' in FIG. 2B.

In FIGS. 13A-13B, a layer 223 of $Si_3N_4$ is deposited over $SiO_2$ ridges 222 and DLC layer 216 in a manner analogous to FIGS. 6A-6B.

In FIGS. 14A-14B and FIGS. 15A-15B, which are analogous to FIGS. 7A-7B and FIGS. 8A-8B, respectively, strips 224 of $Si_3N_4$ are created on DLC layer 216. The $Si_3N_4$ strips 224 are formed in pairs of parallel strips, with each pair being formed from the material that was deposited on the two sidewalls of each $SiO_2$ ridge 222. However, because the $SiO_2$ ridges 222 are not parallel but are generally radially-directed, adjacent pairs of strips 224 are also not parallel, but generally radially-directed.

In FIGS. 16A-16B, the upper layer 216 of DLC is etched using the upper patterned $Si_3N_4$ strips 224 as an etch mask. An $O_2$ RIE can selectively etch the DLC layer 216 without significantly attacking the SOG material 214 beneath the DLC layer 216. This leaves strips 217 of DLC layer 216 on SOG material 214.

In FIGS. 17A-17B, a fluorine-based anisotropic RIE is used to etch vertically through the SOG material 214 and underlying portions of the buried $Si_3N_4$ strips 212, using the DLC strips 217 and any remaining material from the upper $Si_3N_4$ strips 224 from FIGS. 16A-16B as an etch mask. This leaves DLC strips 217 and underlying pillars 226 of $Si_3N_4$ that remain from the $Si_3N_4$ strips 212. The DLC strips 217 and underlying pillars 226 are separated by strips of DLC layer 202.

In FIGS. 18A-18B, an $O_2$ RIE is used to remove the DLC strips 217 and the exposed regions of DLC 202, leaving some remaining SOG material 214 exposed, which is then removed by a wet etch (e.g. buffered HF). At this point, a two dimensional array of $Si_3N_4$ pillars 226 remains, the pillars 226 being formed from the $Si_3N_4$ strips 212 that were formed over the first DLC layer 202.

In FIGS. 19A-19B, the process is completed by performing an anisotropic fluorine-based RIE etch of the substrate 200, using the $Si_3N_4$ pillars 226 from FIGS. 18A-18B as the etch mask. After etching to the desired depth, an isotropic $O_2$ RIE is used to remove the DLC layer 202, which releases any remaining $Si_3N_4$ from pillars 226 to be washed away in a subsequent cleaning step. At the completion of the process, a two-dimensional array of pillars 228 remains on the substrate. The result is the master disk with an array of pillars 228 patterned into concentric rings 230 and lines 234. The lines 234 are formed into pairs 236 of parallel lines, but the pairs 236 are not parallel but generally radially-directed.

The pillars are spaced apart about 30 nm and have a width and length of about 15 nm. The 30 nm pillar spacing or pitch is half of that used in the e-beam lithography step, which defined a 60 nm feature pitch. This array may be used as a master disk for nanoimprinting patterned-media disks with a density of about 700 Gigabit/$in^2$. If a hole-type nanoimprint mold is desired, a single nanoimprinting step may be used to generate a reverse-tone image of the pillar array in a resist layer, which will allow a hole-type patterned to be transferred to the mold substrate by RIE. If a pillar-type imprint mold is desired, either an opposite-tone nanoimprinting step may be used, or two generations of conventional nanoimprinting used.

Figure 20:
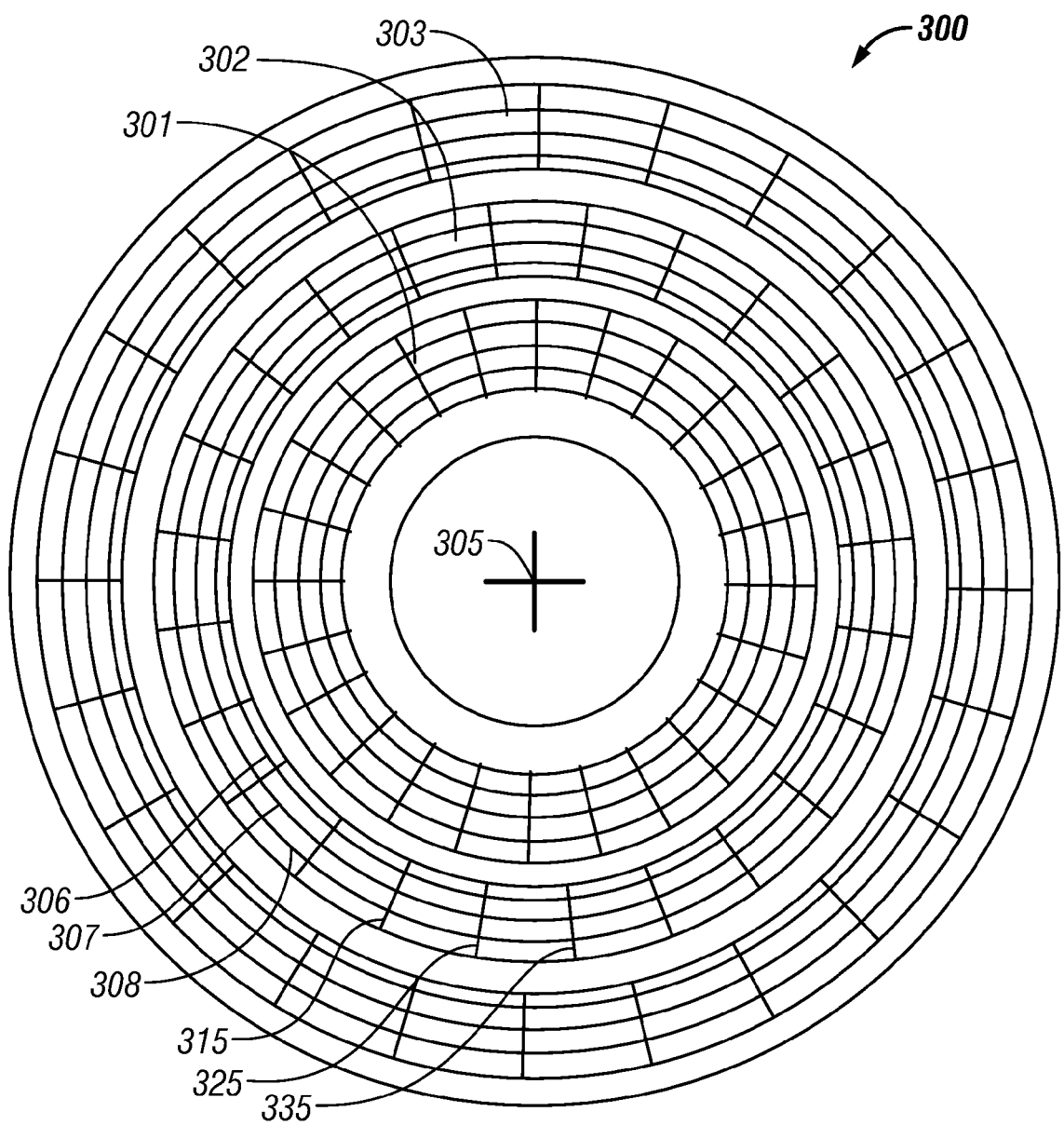
FIG. 20 is an illustration of a master disk showing the pattern of concentric rings in annular bands and the pattern of radially-directed pairs of lines in each band.

The appearance of the pattern of pillars in FIGS. 19A-19B is for a very localized region and does not reveal the large-scale curvature of the concentric rings and radially-directed lines in the master disk. To give a better perspective of the pattern, FIG. 20 shows a master disk 300 with a center 305 and three annular zones or bands 301, 302, 303, with each band illustrating a few representative concentric rings and radially-directed pairs of lines, like rings 306, 307, 308 and line pairs 315, 325, 335 in band 302. The rings and line pairs represent the pattern of individual pillars (not shown). Because the sidewall lithography process creates a pair of lines parallel to and equidistantly spaced from a starting ridge, all radially-directed lines cannot be truly radial. This is illustrated in FIG. 21 which is an expanded view of a portion of the master disk shown in FIG. 20. FIG. 21 shows a plurality of pillars arranged in nine concentric rings, including radially inner ring 350 and radially outer ring 358. The pillars are also arranged in a plurality of line pairs 315, 325, 335. Each line in a pair is equally spaced from a radius, like lines 312, 314 spaced from radius 310. The radii 310, 320, 330 coincide with the ridges that were used to deposit the sidewalls, with the ridges subsequently being removed during the fabrication process. Thus, as is apparent from FIG. 21, the lines in each pair are parallel, and thus not truly radial. As a result, the angular spacing of the pillars in the lines of a pair in the radially inner ring are not equally angularly spaced with the pillars in the radially outer ring, as shown by pillars in lines 312, 314 and inner ring 350 compared with the pillars in lines 312, 314 and outer ring 358. Also from FIG. 21 it is apparent that within each ring the spacing between pillars is not constant and increases with increasing radius.

In patterned-media disks, a relatively constant bit spacing is important for accurate write synchronization and readback detection. Standard disk drive data channel architectures assume a constant bit frequency passing by the head, and if the spacing is not constant, phase errors can occur. If the phase error due to sidewall lithography limitations becomes more than a few percent of the bit spacing, the errors may be unacceptable. However, in this invention, even though the sidewall lithography process results in the creation of parallel and not truly radial lines in the master disk, the master disk may be used to nanoimprint acceptable patterned-media disks. First, the angular spacing of the pillars can be made equal near the middle of a band, such as at ring 354 in FIG. 21. Thus, within each band, the difference in angular spacing between the pillars in the radially inner and outer rings of the band is reduced. Secondly, if the radial lines are kept short the difference in spacing is also reduced. This can be accomplished if a large number of bands are used. If a large enough number of bands is used, the amount of difference in spacing between the pillars in the radially inner and outer rings of the band can be small enough to not adversely affect reading and writing on the resulting nanoimprinted disks. Typical disk drives may use about 20 annular data bands. Depending on the size of the disk, this number or a smaller number of bands will result in an acceptable difference in pillar spacing so that the master disk made with sidewall lithography may be used.

The arrangement of pillars in the master disk portion of FIG. 21 would result in patterned-media disks with the magnetic islands arranged as shown in FIG. 2A. Also, as explained above with respect to FIG. 2A, the islands may be arranged to form arcuate shaped lines in the radial direction. Of course, the master disk may also have pillars arranged in a manner to nanoimprint disks with the magnetic islands arranged as in FIG. 2B. In this type of master disk, the pairs of parallel lines, like parallel lines 312, 314, would be aligned at an angle θ with respect to the radius 310. Also, as explained above with respect to FIG. 2B, the islands may be arranged so that islands in alternate tracks form arcuate shaped lines in the radial direction.

The magnetic islands in FIGS. 2A and 2B are depicted as having a generally circular shape, which is the preferred shape for patterned-media disks. However, the magnetic islands are not required to have a circular shape. Because the pillars produced in the master disk by the sidewall lithography process discussed above are the result of the intersection of various line patterns, the shape of the pillars will not be circular, and thus the resulting nanoimprinted magnetic islands will not be circular. As can be seen in FIG. 22A, rectangular-shaped pillars would be produced if radial ridges are used in the sidewall lithography process, resulting in disks having the magnetic island pattern shown in FIG. 2A. In FIG. 22B, non-rectangular parallelogram-shaped pillars would be produced if generally radially-directed ridges are used in the sidewall lithography process, resulting in disks having the magnetic island pattern shown generally in FIG. 2B. In FIG. 22B, the non-rectangular parallelogram-shaped pillar would have an acute interior angle generally equal to the complement of the acute angle θ made by the generally radial ridge with a radius. The limits in pattern transfer resolution and in the various etching steps in making the master disk will result in a rounding off of the corners of the magnetic islands, so the magnetic islands would not have the precise shapes shown in FIGS. 22A-22B.

FIGS. 23A-23B through FIGS. 33A-33B illustrate another implementation of the method of this invention for making a master disk using sidewall lithography. In each of the figures, figure A is a top view and figure B is a side sectional view. In this method, sidewall lithography is used to make two different molds, which are then used to make the master disk.

The first steps of the process are identical to FIGS. 4A-4B through FIGS. 8A-8B. FIGS. 23A-23B of this process are the same as FIGS. 8A-8B and result in $Si_3N_4$ strips 412 over a thin DLC layer 402 on a quartz substrate 400. The strips 412 are patterned as either the concentric rings or the generally radially-directed lines.

In FIGS. 24A-24B, the DLC layer 402 is etched using an anisotropic $O_2$ RIE step to transfer the pattern of the $Si_3N_4$ strips 412 into the DLC layer 402.

Figure 25A:
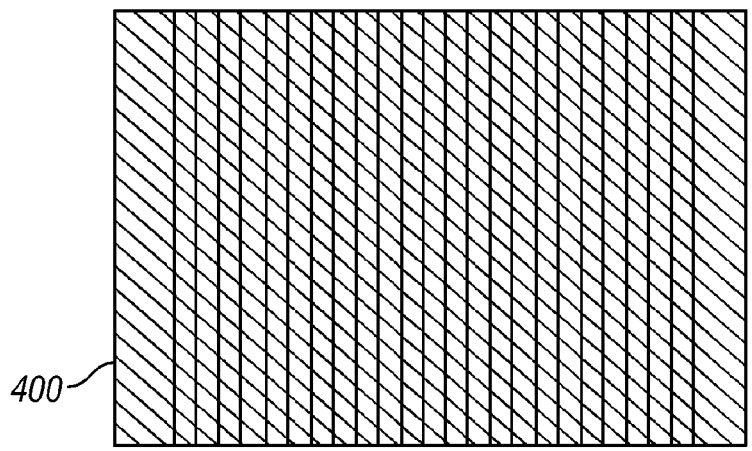
FIGS. 25A and 25B illustrate top and side sectional views, respectively, of a step in a second implementation of this invention wherein sidewall lithography is used to make two different molds, which are then used to make the master disk.
Figure 25B:
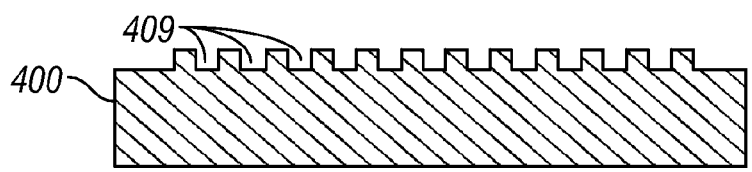

In FIGS. 25A-25B, an anisotropic fluorine-based RIE is used to transfer the pattern from the $Si_3N_4$ strips 412 and underlying DLC layer 402 into the quartz substrate 400. Then an isotropic O2 RIE is used to remove the DLC layer 402, which releases any remaining $Si_3N_4$ material to be washed away in a subsequent wash. At this point, a "dense groove mold" has been completed with grooves 409 in substrate 400. Using the same dimensions as discussed for the first method would leave a pattern of 15 nm wide grooves 409 with a pitch of 30 nm on the surface of the substrate 400. This mold will be used in FIGS. 27A-27B. The same process is then repeated to make a second mold, but with a different pattern of grooves. If the first mold has the grooves patterned in concentric rings, then the second mold would have the grooves patterned in the generally radially-directed lines.

Figure 26A:
FIGS. 26A and 26B illustrate top and side sectional views, respectively, of a step in a second implementation of this invention wherein sidewall lithography is used to make two different molds, which are then used to make the master disk.
Figure 26B:
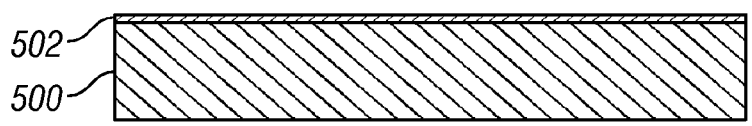

In FIGS. 26A-26B, a thin DLC layer 502 (~10 nm) is deposited on a quartz substrate 500 which will become the master disk.

Figure 27A:
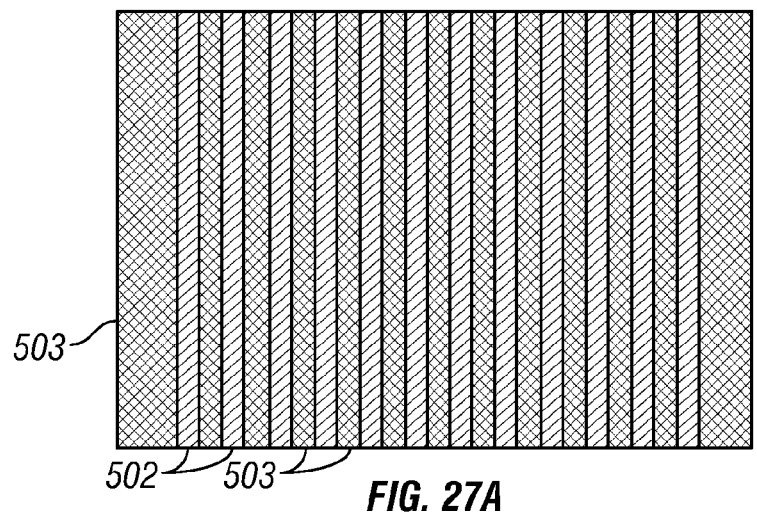
FIGS. 27A and 27B illustrate top and side sectional views, respectively, of a step in a second implementation of this invention wherein sidewall lithography is used to make two different molds, which are then used to make the master disk.
Figure 27B:
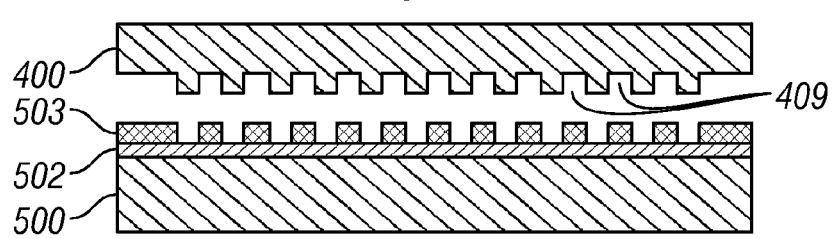

In FIGS. 27A-27B, a layer of resist 503 is deposited on DLC layer 502 and an ultraviolet (UV)-cure nanoimprint lithography process is performed using the first mold 400, e.g., the one with grooves 409 formed as concentric rings. This leaves a reverse-tone resist 503 replica of the grooves 409 of the first mold 400 on the substrate 500.

Figure 28A:
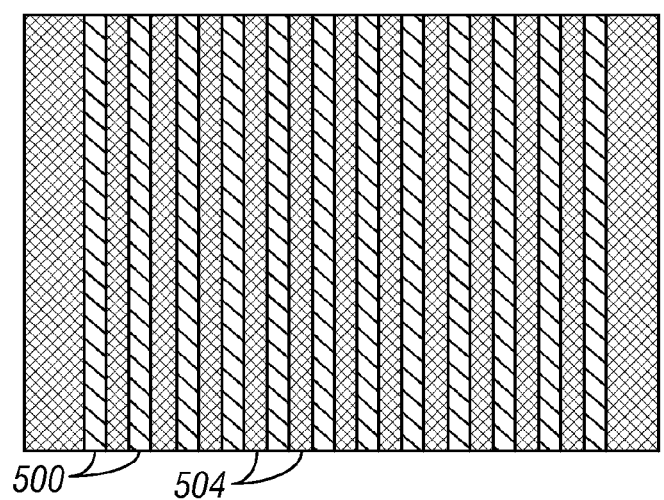
FIGS. 28A and 28B illustrate top and side sectional views, respectively, of a step in a second implementation of this invention wherein sidewall lithography is used to make two different molds, which are then used to make the master disk.
Figure 28B:
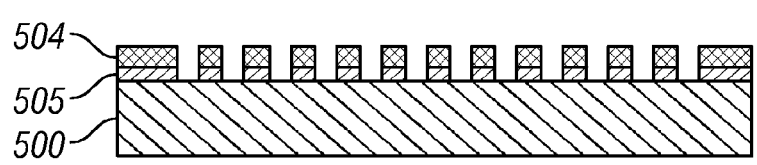

In FIGS. 28A-28B, the imprinted resist 503 is used an etch mask for an anisotropic $O_2$ RIE of the DLC layer 502, resulting in resist stripes 504 overlying stripes 505 of DLC, with the DLC removed in the regions between the resist stripes 504.

Figure 29A:
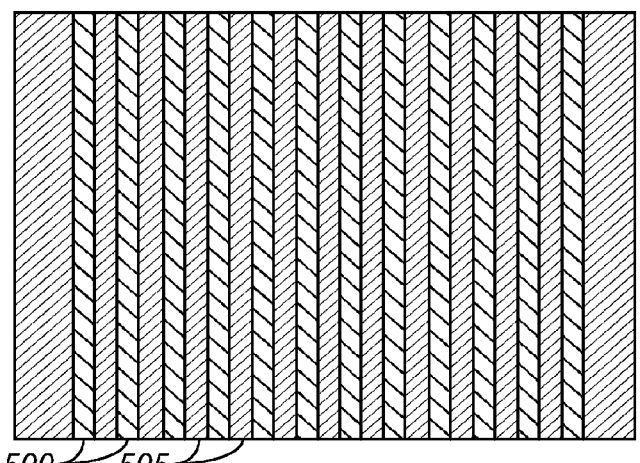
FIGS. 29A and 29B illustrate top and side sectional views, respectively, of a step in a second implementation of this invention wherein sidewall lithography is used to make two different molds, which are then used to make the master disk.
Figure 29B:
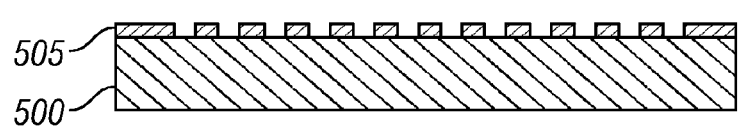

In FIGS. 29A-29B, the resist stripes 504 are stripped with a wet etch such as hot N-Methyl-2-pyrrolidone (NMP), leaving the DLC stripes 505 layer on the surface of quartz substrate 500.

Figure 30A:
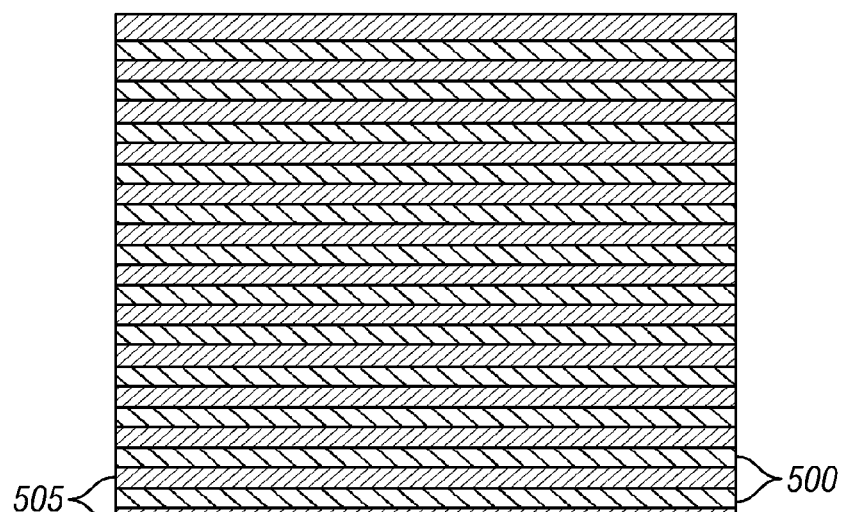
FIGS. 30A and 30B illustrate top and side sectional views, respectively, of a step in a second implementation of this invention wherein sidewall lithography is used to make two different molds, which are then used to make the master disk.
Figure 30B:

In FIGS. 30A-30B, the substrate 500 is rotated (90 degrees in this example).

Figure 31A:
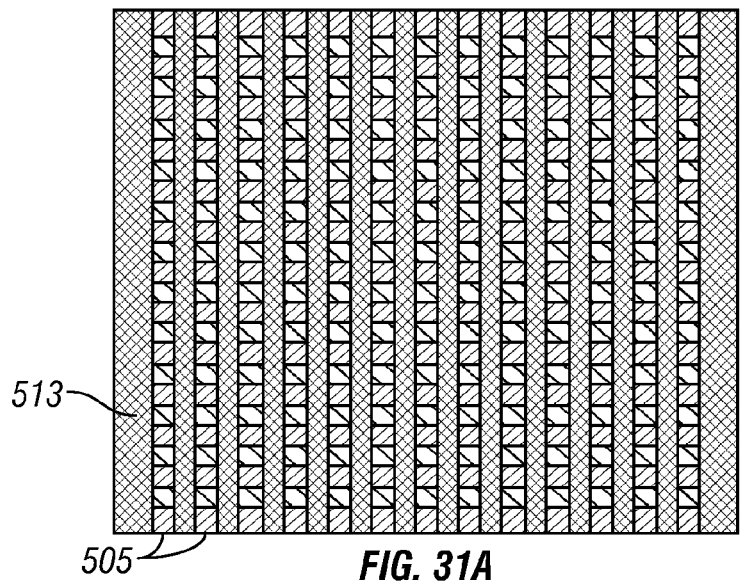
FIGS. 31A and 31B illustrate top and side sectional views, respectively, of a step in a second implementation of this invention wherein sidewall lithography is used to make two different molds, which are then used to make the master disk.
Figure 31B:
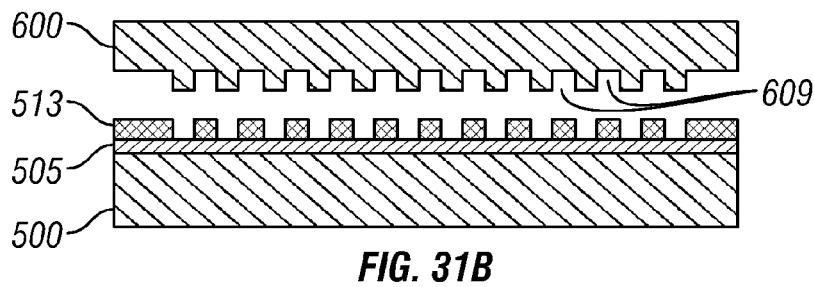

In FIGS. 31A-31B, a layer of resist 513 is deposited over the DLC stripes 505 and an ultraviolet (UV)-cure nanoimprint lithography process is performed using the second mold 600 with grooves 609, e.g., the one with grooves 609 patterned as generally radially-directed lines.

Figure 32A:
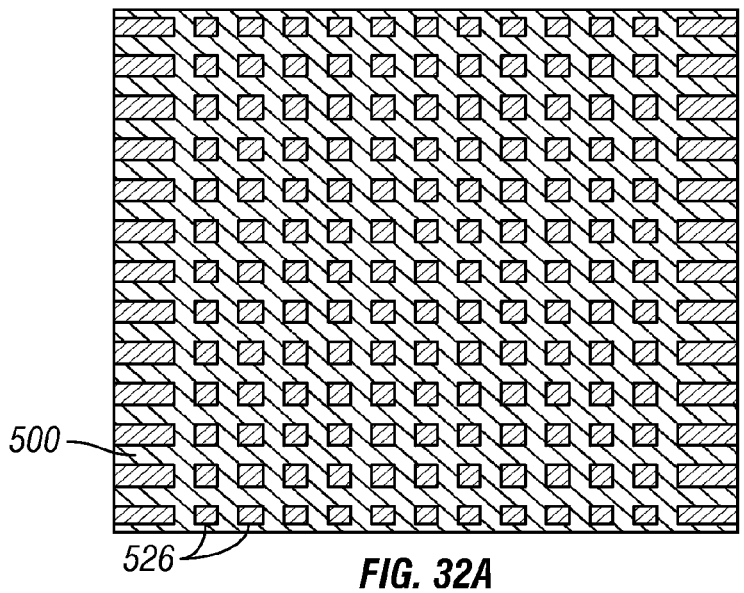
FIGS. 32A and 32B illustrate top and side sectional views, respectively, of a step in a second implementation of this invention wherein sidewall lithography is used to make two different molds, which are then used to make the master disk.
Figure 32B:
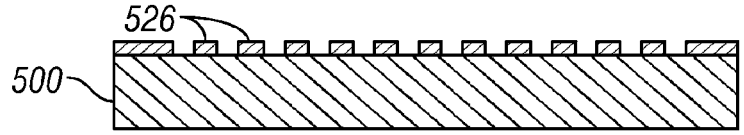

In FIGS. 32A-32B, the DLC layer 502 is again etched using an anisotropic $O_2$ RIE step. This will etch the DLC regions exposed at the bottom of the valleys in the second imprint pattern. It will also clear the residual layer of resist mentioned above. The remaining imprint resist is stripped with a wet etch such as hot NMP, leaving the thin DLC layer 502 (now patterned into a two dimensional array of pillars 526) on the quartz substrate 500.

Figure 33A:
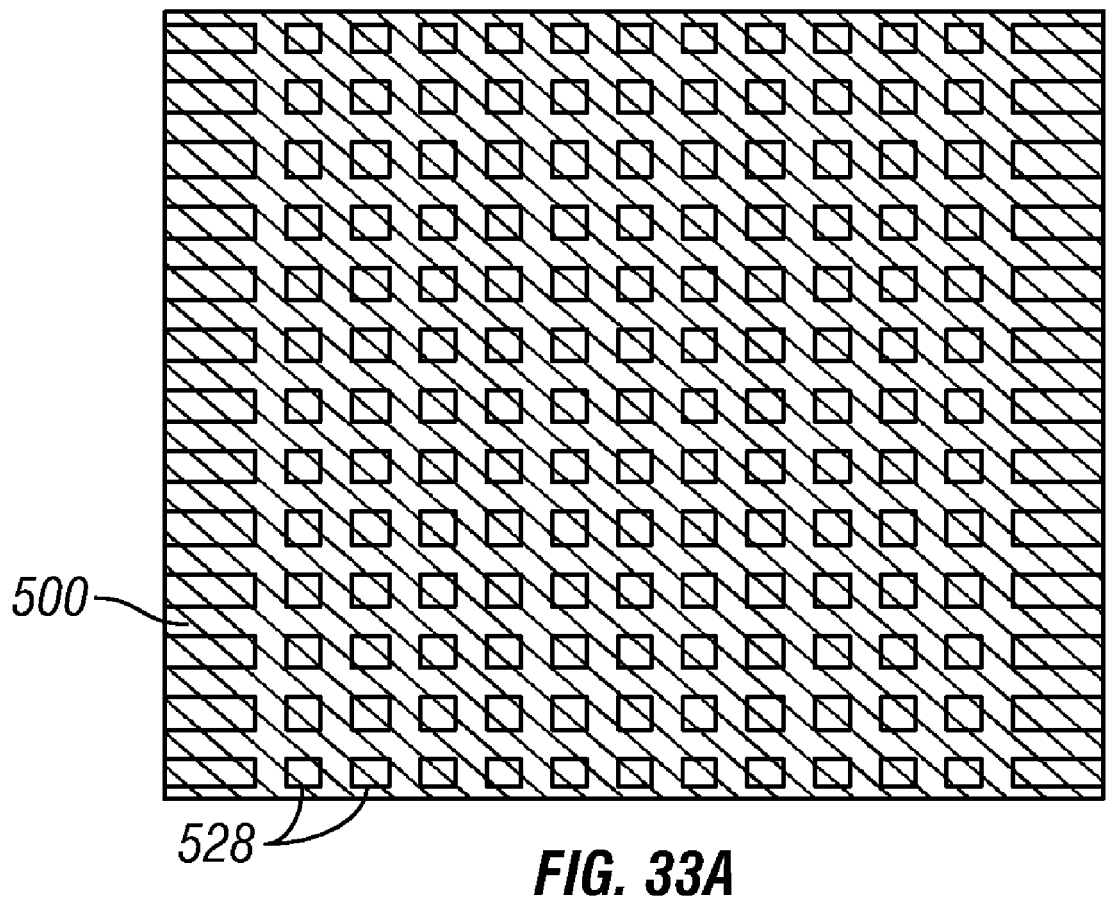
FIGS. 33A and 33B illustrate top and side sectional views, respectively, of a step in a second implementation of this invention wherein sidewall lithography is used to make two different molds, which are then used to make the master disk.
Figure 33B:
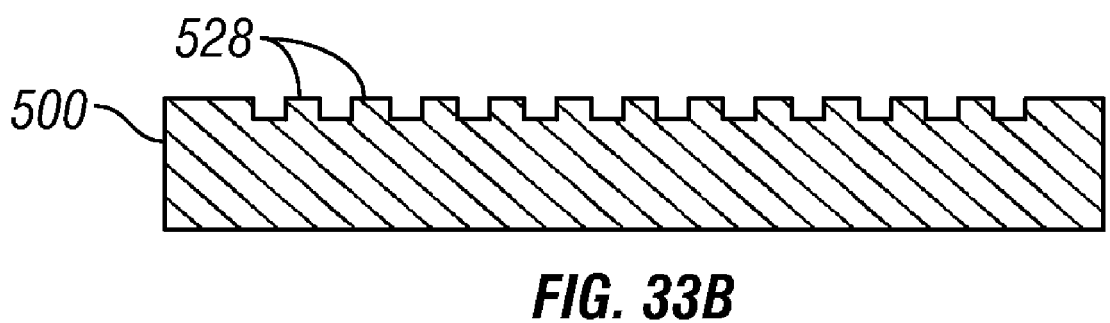

In FIGS. 33A-33B, the DLC layer patterned into pillars 526 is used as an etch mask for an anisotropic fluorine-based RIE of the quartz substrate 500, which transfers the pattern in the DLC into the substrate 500, leaving pillars 528. The DLC is then stripped using an isotropic $O_2$ RIE. At this point, a pattern of pillars 528 protrudes from the finished quartz substrate 500, resulting in the master disk.

In another implementation of the method of this invention, it is possible to perform one e-beam lithography step and one mold imprint step to pattern the master disk, with either the e-beam lithography step or the imprint mold step being performed first. For example, an e-beam lift-off lithography step can be used to create a pattern of germanium (Ge) stripes over a thin DLC layer on a Si substrate. Then a dense groove mold, like that made in the second implementation and shown in FIGS. 25A-25B can be used to create an imprinted resist pattern at an angle relative to the Ge stripes. The Ge stripes can be patterned into pillars using an anisotropic fluorine-based RIE with the imprinted pattern as an etch mask. An anisotropic $O_2$ RIE can then be used to remove the resist and transfer the Ge pattern into the DLC layer. A subsequent anisotropic fluorine-based RIE step can then be used to transfer the DLC pattern into the Si substrate. After stripping the remaining DLC and washing, a two-dimensional array of pillars remains on the Si substrate.

In all of the examples shown above, sidewall lithography is used to double the number of lines in a one-dimensional array. The process may then be repeated to double the number of lines again, for a quadrupling of the line density. For example, if conventional lithography is used to produce an array of lines with 100 nm period, but repeating the sidewall process twice, an array of lines with 25 nm period can be created. Then, employing the methods shown above, two dimensional arrays can be created with period equal to ¼ the original line density. In this example, a 1 Terabit/in$^2$ density pattern could be created with 100 nm pitch lines as the starting point. Quadrupling can be especially useful when the starting line density is low, such as might be the case when optical lithography is used instead of e-beam lithography to create the starting line arrays.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned-media magnetic recording disk comprising: a substrate having a plurality of magnetic islands arranged about a center, the islands being arranged into a plurality of annular bands of concentric circular tracks about said center, the islands in each band being arranged into a plurality of generally radially-directed non-parallel pairs of parallel lines wherein the islands in the parallel lines in each pair are equally circumferentially spaced in all tracks of a band, the pairs of lines being generally equally angularly spaced about said center.

2. The disk of claim 1 wherein the islands in a circular track generally at the middle of each band are generally equally angularly spaced about said track.

3. The disk of claim 1 wherein the radially inner ends of the pairs of lines have the same equal angular spacing about said center as the radially outer ends of the pairs of lines.

4. The disk of claim 1 wherein each pair of lines is aligned along a radius from said center.

5. The disk of claim 4 wherein each pair of lines has a generally arcuate shape.

6. The disk of claim 1 wherein each pair of lines is oriented at an acute angle with a radius from said center.

7. The disk of claim 6 wherein the islands in alternate tracks are aligned to form generally radially-directed arcuate-shaped lines.

8. The disk of claim 7 wherein the islands are shaped as generally non-rectangular parallelograms having acute interior angles generally equal to the complement of said acute angle of orientation.

* * * * *